(12) United States Patent
Oomori et al.

(10) Patent No.: US 7,722,349 B2
(45) Date of Patent: May 25, 2010

(54) INJECTION MOLDING MACHINE HAVING A CHECK VALVE CLOSING POSITION DETERMINING DEVICE

(75) Inventors: Akira Oomori, Yamanashi (JP); Junpei Maruyama, Yamanashi (JP); Satoshi Takatsugi, Yamanashi (JP); Wataru Shiraishi, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 222 days.

(21) Appl. No.: 11/937,708

(22) Filed: Nov. 9, 2007

(65) Prior Publication Data

US 2008/0305202 A1 Dec. 11, 2008

(30) Foreign Application Priority Data

Jun. 5, 2007 (JP) ............................. 2007-149816

(51) Int. Cl.
*B29C 45/80* (2006.01)
(52) U.S. Cl. ....................... 425/145; 425/150
(58) Field of Classification Search ................ 425/145, 425/150
See application file for complete search history.

(56) References Cited

U.S. PATENT DOCUMENTS

| | | | |
|---|---|---|---|
| 4,836,962 A * | 6/1989 | Aoki ........................... | 425/145 |
| 4,846,651 A * | 7/1989 | Matsuda et al. ............. | 425/145 |
| 5,153,149 A | 10/1992 | Naito et al. | |
| 2004/0142056 A1 | 7/2004 | Watanabe et al. | |

FOREIGN PATENT DOCUMENTS

| EP | 1439047 A1 | 7/2004 |
|---|---|---|
| JP | 62-003916 A | 1/1987 |
| JP | 1-168421 A | 7/1989 |
| JP | 01-281912 A | 11/1989 |
| JP | 2007112100 A | 5/2007 |
| WO | 03106136 A1 | 12/2003 |

OTHER PUBLICATIONS

EP Search Report for 07120196.6 dated Oct. 8, 2008.

* cited by examiner

*Primary Examiner*—Tim Heitbrink
(74) *Attorney, Agent, or Firm*—Lowe Hauptman Ham & Berner, LLP (57) ABSTRACT

An injection molding machine estimates a check valve wear amount, making it possible to predict a check valve use limit. At start of injection, the check valve is at a position advanced a stroke S0 with respect to a screw position (a position of a check seat that contacts the check valve and closes a resin flow channel). As the screw advances, the check valve retreats and closes when the screw moves a distance X0. When the check valve is worn $\Delta S$ ($S1=S0+\Delta S$), it closes when the screw moves X1. Since the check valve stroke and the distance the screw moves until the check valve closes are proportional, $S0/X0=S1/X1=a$. Therefore, $\Delta S=aX1-S0$, and the wear amount $\Delta S$ can be obtained by detecting the check valve closing position X1 and using this position X1 and the known stroke S0. The closing position is detected from the peak value of rotational force acting on the screw. Once the wear amount is obtained, the check valve use limit can be predicted from an allowable value of wear.

11 Claims, 10 Drawing Sheets

| | MOLDING CONDITION | WEAR RATE | ALLOWABLE VALUE OF WEAR | COEFFICIENT FOR OBTAINING WEAR AMOUNT |
|---|---|---|---|---|
| 1 | MOLDING CONDITION 1 | WEAR RATE $R(1)$ | $\Delta S_D(1)$ | $a(1)$ |
| 2 | MOLDING CONDITION 2 | WEAR RATE $R(2)$ | $\Delta S_D(2)$ | $a(2)$ |
| ⋮ | ⋮ | ⋮ | ⋮ | ⋮ |
| i | MOLDING CONDITION i | WEAR RATE $R(i)$ | $\Delta S_D(i)$ | $a(i)$ |
| ⋮ | ⋮ | ⋮ | ⋮ | ⋮ |
| N | MOLDING CONDITION N | WEAR RATE $R(N)$ | $\Delta S_D(N)$ | $a(N)$ |

INJECTION MOLDING MACHINE HAVING A CHECK VALVE CLOSING POSITION DETERMINING DEVICE

RELATED APPLICATIONS

The present application is based on, and claims priority from, Japanese Application Number 2007-149816, filed Jun. 5, 2007, the disclosure of which is hereby incorporated by reference herein in its entirety.

BACKGROUND OF THE INVENTION

1. Field of the Invention

The present invention relates to an injection molding machine, and more particularly to an injection molding machine that detects, displays, and predicts a wear amount or a closing stroke of a check valve.

2. Description of the Related Art

An in-line screw type injection molding machine has a check valve unit on a screw tip to prevent backflow of resin while the screw advances.

Resin that is melted during a metering stage is accumulated in front of the screw inside a heated barrel. Injection and pressure holding stages are begun, the screw advances, and the accumulated resin is injected into a mold and fills the interior of the mold. During a time period extending from the start of injection to a time when a check valve closes a resin flow channel, the resin flows back from the front of the check valve toward the rear. The amount of this backflow affects the amount of resin filling the mold, and therefore affects the quality of the molded article.

As the injection molding machine continues to be used over a long period of time, the check valve begins to wear due to corrosion caused by the resin and by friction during rotation of the screw. As a result, the backflow amount changes, affecting the quality of the molded article.

Consequently, a variety of methods for detecting check valve wear and resin backflow amounts are known.

For example, methods are known that detect the backflow amount based on the distance over which the screw advances during pressure holding (JP62-3916A) or on the speed with which the screw advances during pressure holding (JP01-281912A) and generate a warning when the detected backflow amount exceeds a predetermined value so as to prevent defective molding, detect wear on the check valve, and the like.

In addition, a method is known that takes advantage of the fact that, once resin backflow occurs when the screw is advanced, a force equivalent to a backflow resin pressure (that is, an injection pressure force) pushes against flights of the screw. This force is divided into a force exerted in the axial direction of the screw (a force that pushes backwards) and a force exerted in the direction of rotation of the screw (a force that causes the screw to rotate in the reverse direction of the direction in which the screw rotates during metering). Therefore, the resin backflow causes a screw rotational force equivalent to the injection pressure force to be exerted on the screw, and once this screw rotational force exceeds a predetermined value it is determined that there is something wrong with the check valve, in the form of wear, damage, or the like (see, for example, JP01-168421A).

In the background art described above, the methods for detecting check valve wear involve detecting the resin backflow amount or the like and outputting an alarm when that backflow amount equals or exceeds a predetermined value. However, check valve wear proceeds gradually, and therefore, at the stage when an alarm is given, the injection molding machine has already formed large quantities of defective molded articles, which is undesirable. Accordingly, it is desirable to be able to grasp the extent of wear on the check valve, and take the necessary steps to cope with the situation by ascertaining that the check valve has reached its use limit, before the alarm is given.

SUMMARY OF THE INVENTION

The present invention provides an injection molding machine that estimates a check valve wear amount or closing stroke during molding, further predicts a wear amount thereafter, and make it possible to predict the check valve use limit.

According to one aspect of the present invention, the injection molding machine comprises: a screw having a check valve and arranged rotatable and axially movable in a cylinder; detecting means for detecting an axial position of the screw in an advancing motion of the screw in the cylinder; check-valve closing position determining means that determines an axial position of the screw when the check valve closes in the advancing motion of the screw, as a check-valve closing position; and calculating means that calculates a distance of the axial motion of the screw from a position where the screw starts the advancing motion to the check-valve closing position as a check valve closing stroke.

According to another aspect of the present invention, the injection molding machine comprises: a screw having a check valve and arranged rotatable and axially movable in a cylinder; detecting means for detecting an axial position of the screw in an advancing motion of the screw in the cylinder; check-valve closing position determining means that determines an axial position of the screw when the check valve closes in the advancing motion of the screw, as a check-valve closing position; and display means that displays a distance of the axial motion of the screw from a position where the screw starts the advancing motion to the check-valve closing position.

According to still another aspect of the present invention, the injection molding machine comprises: a screw having a check valve and arranged rotatable and axially movable in a cylinder; detecting means for detecting an axial position of the screw in an advancing motion of the screw in the cylinder; check-valve closing position determining means that determines an axial position of the screw when the check valve closes in the advancing motion of the screw, as a check-valve closing position; and display means that displays the check-valve closing position.

According to yet another aspect of the present invention, the injection molding machine comprising: a screw having a check valve and arranged rotatable and axially movable in a cylinder; detecting means for detecting an axial position of the screw in an advancing motion of the screw in the cylinder; check-valve closing position determining means that determines an axial position of the screw when the check valve closes in the advancing motion of the screw, as a check-valve closing position; and closing-stroke calculating means that calculates a check-valve closing stroke based on a set closing stroke of the check valve when the check valve is newly mounted on the screw and a distance of the axial motion of the screw from a position where the screw starts the advancing motion to the determined check-valve closing position with the check valve newly mounted on the screw, and a distance of the axial motion of the screw from a position where the screw starts the advancing motion to the determined check-valve closing position with the check valve after being used in injection molding operations.

The injection molding machine may further comprise wear-amount calculating means that calculates a wear amount of at least one of the check valve, a screw head and a check seat based on an initial closing stroke and a set wear amount when the check valve is newly mounted on the screw and the check-valve closing stroke calculated by the calculating means.

The check-valve closing position determining means may comprise a rotational force detecting means that detects a rotational force exerted on the screw, and may determine the axial position of the screw where the rotational force exerted on the screw detected in the advance motion of the screw peaks as the check valve closing position.

The injection molding machine may further comprise wear rate calculating means that calculates a wear rate based on an amount of change in the calculated wear amount or an mount of change in the calculated closing stroke, and predicting means that predicts when the wear amount will exceed an allowable value using the calculated wear rate.

The wear rate calculating means may calculate the wear rate by dividing the amount of change in the calculated wear amount or the mount of change in the calculated closing stroke by any one of the number of mold shots, operating time of the injection molding machine, metering time and the number of screw rotations in a period during which the amount of change in the calculated wear amount or the amount of change in the calculated closing stroke occurred.

The injection molding machine may further comprise storage means for storing the wear rate for each of molding conditions.

Since check valve wear amount and the point in time when the check valve wear will exceed the allowable value indicating check valve use limit can be predicted, the check valve can be replaced prior to a large quantity of defective moldings occurring.

DETAILED DESCRIPTION

A description is given of the principle of estimating a wear amount of a check valve according to the present invention.

Figure 1:
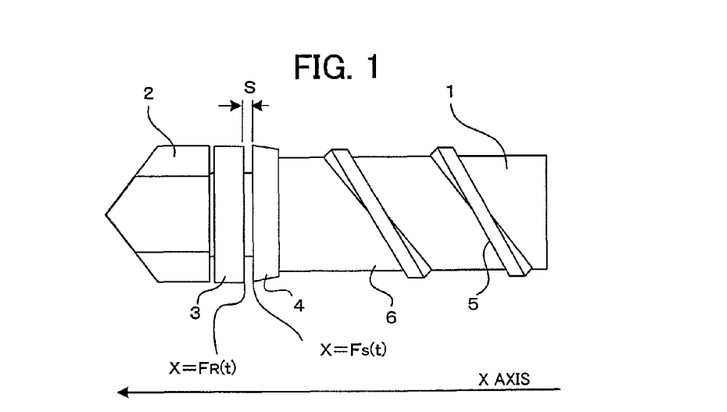
FIG. 1 is a schematic diagram illustrating an example of a conventional check valve unit.

FIG. 1 is a schematic diagram illustrating an example of a check valve unit used conventionally. A check valve 3 that is capable of moving in the axial direction of a screw 1 is provided on a tip of the screw 1, at a portion of reduced diameter between the screw head 2 mounted on the tip of the screw 1 and the body of the screw 1, and a check seat 4 that contacts and closely adheres to the check valve 3 to close a resin flow channel is provided on a screw 1 body side of the portion of reduced diameter.

In a metering stage, the screw 1 rotates, resin pellets supplied from the rear of the screw 1 are melted by shear heat generated by rotation of the screw 1 during metering and by heat from a heater provided on the outside of a heated barrel 7, not shown, into which the screw 1 is inserted. The melted resin causes the resin pressure behind the check valve 3 to increase, generating a force that pushes the check valve 3 forward and moving the check valve 3 forward. As the check valve 3 is pushed forward, resin in grooves 6 to the rear passes through a resin flow channel between the check valve 3 and the portion of reduced diameter and flows in front of the check valve 3, increasing the pressure inside the heated barrel 7 in front of the screw head 2. When the pressure in front of the check valve 3 exceeds a predetermined pressure (back pressure), the screw 1 is pushed back and the pressure in front of the check valve 3 is reduced. As the screw 1 rotates further the pressure behind the check valve 3 becomes higher than the pressure in front of the check valve 3, and the melted resin continues to flow to the front of the check valve 3. When the screw 1 retreats a predetermined amount (to a metering position), screw rotation is stopped, ending metering.

Next is the injection stage, in which, as the screw 1 advances to fill a mold with the resin (in FIG. 1, moving from right to left), the resin pressure building ahead of the screw head 2 increases, causing the check valve 3 to retreat and adhere closely to the check seat 4, closing the resin flow channel and preventing the melted resin from flowing backward (back-flowing) in the direction of retreat of the screw 1.

During the time period from the start of injection to when the check valve 3 closes the resin flow channel, there occurs a backflow of resin from the front of the check valve 3 toward the rear. As the check valve 3 suffers wear, this backflow amount also increases. The backflow resin pushes against flights 5 of the screw 1 with a force equivalent to the resin pressure (injection pressure). This force is divided into a force exerted in the axial direction of the screw 1 (a force that pushes backwards) and a force in the direction of rotation of the screw 1 (a force that causes the screw 1 to rotate in the reverse direction of the direction in which the screw 1 rotates during metering), thereby applying rotational force to the screw 1.

In addition, once the check valve 3 adheres closely to the check seat 4 and closes the resin flow channel, the backflow of resin virtually stops. During injection, as the screw 1 advances the injection pressure (resin pressure) increases, and therefore rotational force exerted on the screw 1 increases until the check valve 3 closes and decreases once the check valve 3 closes, with the screw rotational force peaking at the point in time when the check valve 3 closes. Accordingly, by detecting the timing of this peak, the timing of the closing of the check valve 3 can be identified.

In FIG. 1, and injection direction in which the screw 1 moves and injects resin is shown as the X axis, a position along the X axis of a face of the check valve 3 that contacts the check seat 4 is given as X=FR(t), and a position along the X axis of a face of the check seat 4 that contacts the check valve 3 is given as X=FS(t). A travel stroke of the check valve 3 is given as S.

Figure 2A:
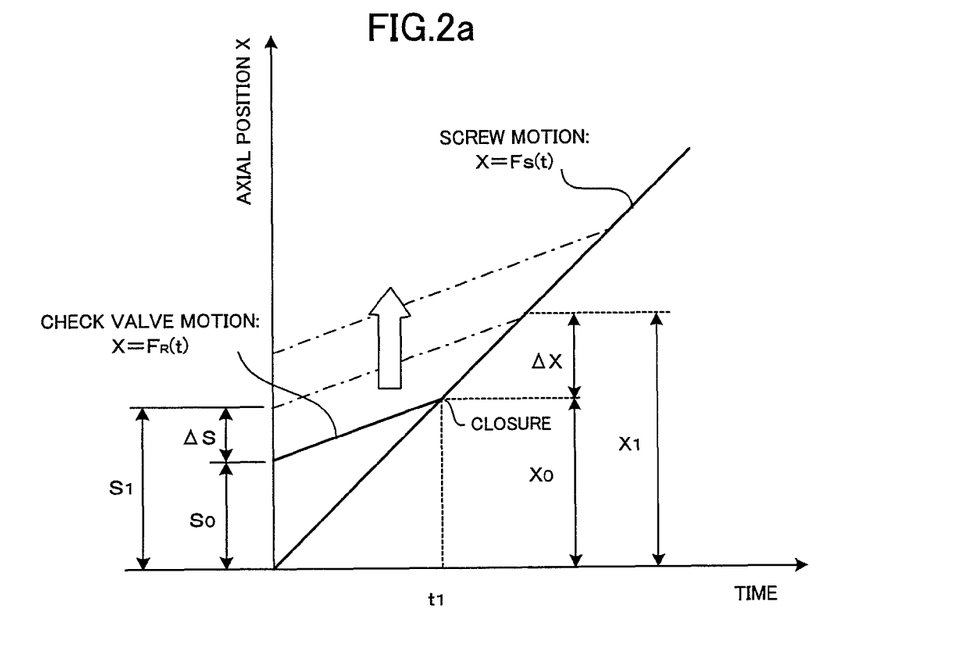
FIGS. 2a and 2b are graphs illustrating a relation between check valve position and screw position during screw advance.
Figure 2B:
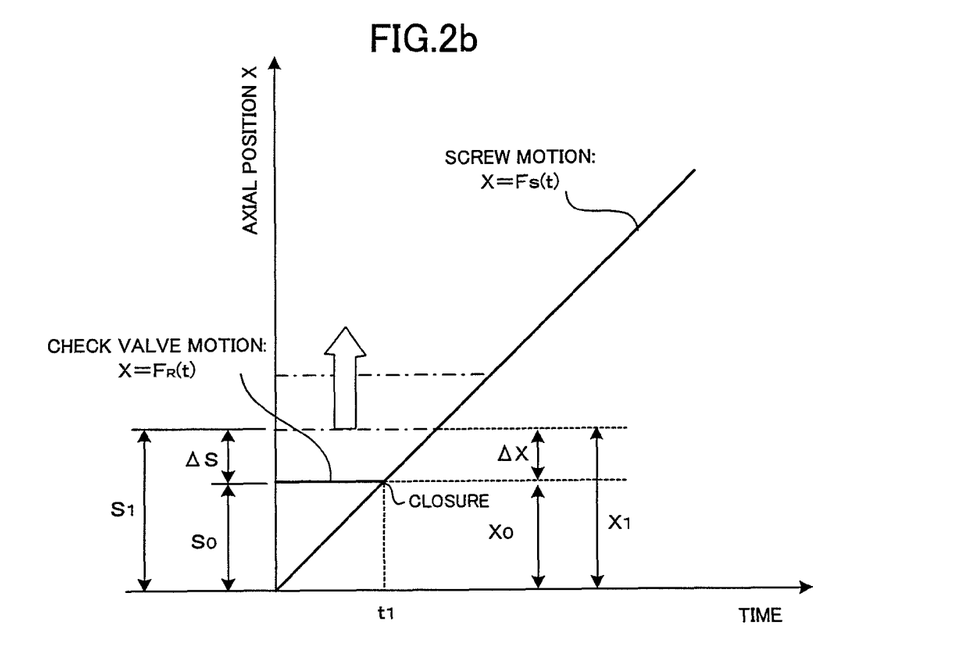

FIGS. 2a and 2b show a relation between screw position and check valve position. As the diagram illustrates, the position of the check valve 3 when the screw 1 is driven in the direction of the X axis and an injection operation is carried out is given as X=FR(t), and the position of the check seat 4 (the screw position) is given as X=FS(t).

A time t at which advance of the screw starts (injection begins) is "0", and the position of the check seat when the screw 1 starts to advance (injection begins) X (=FS(0)) is "0".

When the screw 1 starts to advance, the check valve 3 moves to the screw head 2 side, and therefore the travel stroke S0 through which the check valve 3 travels until it closes is expressed by the following formula:

$$S0=FR(0)-FS(0)$$

As the screw advances the position X=FS(t) of the check seat 4 increases as shown in FIG. 2a. At the same time, however, as the screw advances the resin pressure in front of the check valve increases. As the resin pressure in front of the check valve 3 becomes greater than the resin pressure behind the check valve 3, the check valve 3 is pressed backward, such that, relative to the screw 1, the check valve 3 is driven in a direction that is the opposite of the direction of advance of the screw 1. At t=0, the position of the check valve 3 X=FR(t) is ahead of the position of the check seat 4 X=FS(0) by an amount equal to the travel stroke S0, and advances together with the screw 1, and further, as described above is pushed backward relative to the screw 1, such that a distance between the relative positions of the check valve 3 X=FR(t) and the check seat 4 X=FS(t) gradually shrinks, they come together, and the check valve 3 closes.

If this time is t1, then $$FR(t1)=FS(t1)$$

and if at this time a screw travel distance from the start of injection to the closing of the check valve is X0, then $$X0=FS(t1)-FS(0)$$

As the check valve 3 wears by an amount ΔS and the stroke increases, the travel of the check valve 3 may be expressed by the following formula:

$$F'R(t)=FR(t)+\Delta S$$

and it is necessary to advance the screw 1 greatly until the check valve 3 closes.

The relation between the screw travel distance X0 from the start of injection to the closing of the check valve 3 and the check valve 3 stroke S0 is as follows, where a is a coefficient:

$$S0=aX0$$

When the check valve 3 wears by an amount ΔS, a travel stroke S1 of the check valve 3 from the start of injection to the closing of the check valve 3 is:

$$S1=S0+\Delta S$$

In addition, if at this time the screw travel distance from the start of injection to the closing of the check valve 3 (check seat 4 travel distance) X1 is:

$$X1=X0+\Delta X$$

then:

$$(S0/X0)=(S1/X1)=a \quad (1)$$

To sum up:

$$\Delta S=S1-S0=aX1-S0 \quad (2)$$

or:

$$\Delta S=S1-S0=aX1-aX0=a(X1-X0)=a\Delta X1 \quad (3)$$

By formula (1), the coefficient a is obtained from the screw travel distance X0 from the start of injection to the closing of the check valve 3 and from the stroke S0 of the check valve 3. By formula (2), if the check valve 3 stroke S0 is known, then the wear amount ΔS thereafter of the check valve 3 for which such stroke is known is obtained from the known stroke S0, the coefficient a, and the screw travel distance X1 from the start of injection to the closing of the check valve 3.

Moreover, from formula (3) the wear amount ΔS of the check valve 3 may be obtained by multiplying the increase ΔX1 in the screw travel distance X1 from the start of injection to the closing of the check valve 3 by the coefficient a.

It should be noted that although in the example described above the wear amount ΔS is obtained from S0 and S1, alternatively an evaluation may be made not in terms of the wear amount but of the check valve 3 stroke itself (S1).

In addition, as shown in FIG. 2b, there are also cases in which the screw travel distance from the start of injection to the closing of the check valve 3 and the stroke of the check valve may be deemed to be equivalent. In cases such as these, the screw travel distance X1 from the start of injection to the closing of the check valve 3 can be set as the stroke S1 of the check valve 3. This situation is equivalent to a case in which the coefficient a=1 in the example described above.

In the foregoing description, the coefficient a is obtained keeping a ratio between the screw travel distance X0 from the start of injection to the closing the check valve 3 and the stroke S0 of the check valve 3 constant. Alternatively, the wear amount may be obtained by keeping a difference between the screw distance travel X0 from the start of injection to the closing the check valve 3 and the stroke S0 of the check valve 3 constant. Specifically, the wear amount may be obtained as follows:

$$S0-X0=S1-X1=b \quad (4)$$

$$S1-X1+b \quad (5)$$

$$\Delta S=S1-S0=X1-S0+b \quad (6)$$

In addition, the wear amount may be obtained by using both coefficient a and difference b:

$$\Delta S=S2-S0=aX2-S0+b \quad (7)$$

When using formula (7), the coefficient a and the difference b may be obtained using a check valve 3 for which the strokes before and after wear (S0, S1) as well as the screw travel distance X1 from the start of injection to the closing of the check valve 3 before wear are known and obtaining a screw travel distance X2 from the start of injection to the closing of the check valve 3.

As noted above, the check valve closing position detector detects the screw rotational force and can detect the position of the screw at the point in time when the screw rotational force peaks as the check valve 3 closing position. To detect the screw rotational force, a load on the motor drive means that rotates the screw may be detected, or alternatively, a warp sensor may be provided on the screw and the rotational force exerted on the screw detected. Additionally, the closing of the check valve 3 may be detected from various physical quantities relating to the injection molding machine, such as a point at which there is a change in a direction of a waveform of the injection pressure attendant upon the closing of the check valve 3.

Figure 3:
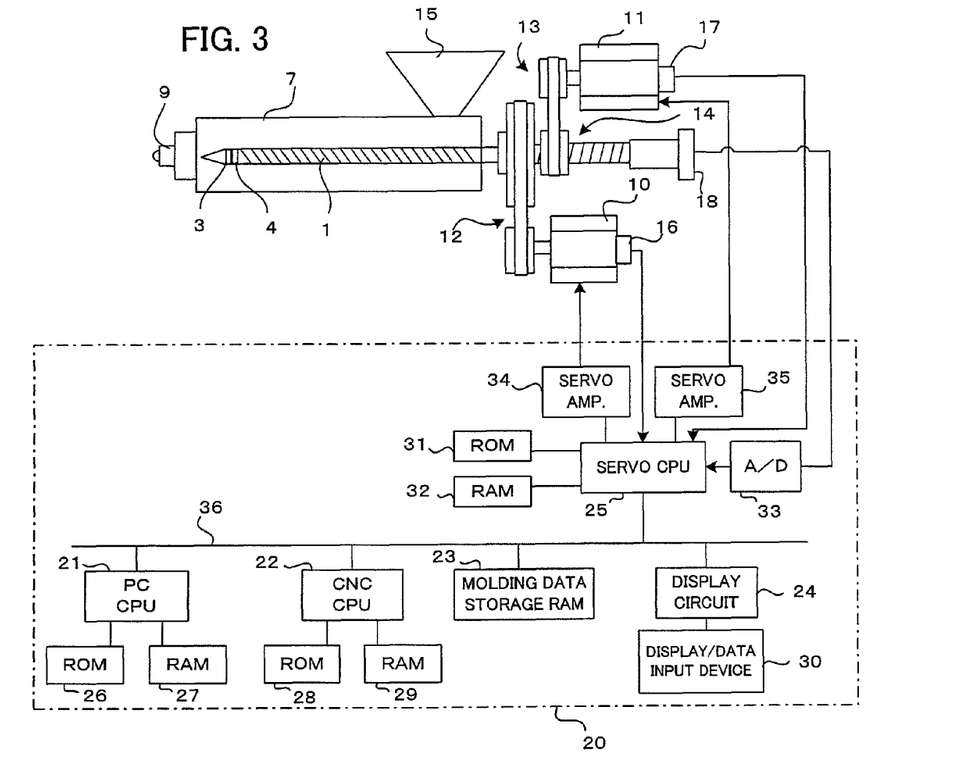
FIG. 3 is a block diagram showing essential parts of an injection molding machine according to one embodiment of the present invention.

FIG. 3 is a block diagram showing essential parts of an injection molding machine according to one embodiment of the present invention.

A nozzle 9 is attached to a front end of the heated barrel 7 into which the screw 1 is inserted, and a feed hopper 15 that supplies resin pellets to an interior of the heated barrel 7 is mounted on a rear end of the barrel 7. A check valve unit comprising a check valve 3 and a check seat 4 is provided at a tip of the screw 1. The screw 1 is rotationally driven by a screw rotation servo motor 10 as a rotary driving means that rotationally drives the screw 1 via a transmission unit 12 composed of a belt, pulleys, and the like. Further, an injection servo motor 11 as an axial direction driving means that drives the screw 1 in the axial direction, is configured to drive the screw 1 in the axial direction and carry out injection and back pressure control via a transmission unit 13 and a ball screw/nut or other conversion unit 14 that converts rotary motion into linear motion. In addition, position/velocity sensors 16, 17 are mounted on the screw rotation servo motor 10 and the injection servo motor 11 to detect the rotational positions/velocities of these motors. The position/velocity detectors 16, 17 are configured to be able to detect a rotational velocity of the screw 1 and a position of the screw 1 (the screw axial direction position) as well as a movement velocity (injection velocity). Moreover, a pressure sensor 18 such as a load cell or the like that detects pressure exerted on the screw 1 from the melted resin in the axial direction is also provided.

A controller 20 that controls the injection molding machine comprises a CNC CPU 22 that is a microprocessor for numerical control, a PC CPU 21 that is a microprocessor for programmable machine controller use, and a servo CPU 25 that is a microprocessor for servo control, all connected by a bus 36.

A controller 20 that controls the injection molding machine comprises a CNC CPU 22 that is a microprocessor for numerical control, a PC CPU 21 that is a microprocessor for programmable machine controller use, and a servo CPU 25 that is a microprocessor for servo control, all connected by a bus 36.

To the PC CPU 21 are connected a ROM 26 storing sequence programs and the like that control the sequence operations of the injection molding machine and a RAM 27 used for temporary storage of computational data and the like. To the CNC CPU 22 are connected a ROM 28 storing automatic operation programs and the like for overall control of the injection molding machine and a RAM 29 used for temporary storage of computational data and like.

A ROM 31, storing control programs solely for servo control that carry out position loop, velocity loop, and electrical current loop processing, and a RAM 32, used for a temporary storage of data, are connected to the servo CPU 25. Further, a servo amp 34 that drives the screw rotation servo motor 10 and a servo amp 35 that drives the injection servo motor 11 that drives the screw 1 in the axial direction and carries out injection are connected to the servo CPU 25 based on instructions from the CPU 25, and further, position/velocity detectors 16, 17 are mounted on the servo motors 10, 11 respectively, with the outputs of the position/velocity detectors 16, 17 fed back to the servo CPU 25. The servo CPU 25 issues motion commands to the axes (the screw rotation server motor 10 and the injection server motor 11) commanded from the CNC CPU 22 and carries out position and velocity feedback control based on the positions and velocities that are fed back from the position/velocity detectors 16, 17, as well as carries out electrical current feedback control and drives and controls the server motors 10, 11 through the servo amps 34, 35. In addition, a current position register is also provided that obtains a position low advance of the screw 1 (screw position in the axial direction) from the position feedback signals from the position/velocity detector 17, and from such current position register the screw position can be detected.

A resin pressure (resin pressure exerted on the screw 1) converted into a digital signal by an A/D converter 33 that converts the detection signal at the pressure sensor 18 into a digital signal is input to the CPU 25. In addition, a commonly known disturbance observer is incorporated in the drive control processing of the screw rotation servo motor 10 so as to detect the rotational force exerted on the screw 1 by the backflow of resin causing the screw 1 to rotate.

It should be noted that servo motors, servo amps, and the like for driving a clamping unit, an ejector unit, and so forth are also provided. However, as these are not directly related to the invention of the present application, they are omitted from FIG. 3.

A data input device 30 with a display device consisting of a liquid crystal or CRT display is connected to the bus 36 via a display circuit 24. Further, a molding data storage RAM 23 consisting of a nonvolatile memory is also connected to the bus 36. A variety of molding conditions and settings, parameters, macro variables, and the like relating to the injection molding operation are stored in the molding data storage RAM 23.

Using the configuration described above, the PC CPU 21 controls the sequence operations of the injection molding machine as a whole, the CNC CPU 22 distributes motion commands to the individual axes servo motors based on the operating programs stored in the ROM 28 and on the molding conditions stored in the molding data storage RAM 23, and the servo CPU 25, based on the motion commands distributed to the axes (the drive axes servo motors; that is, the screw rotation servo motor 10 and the injection servo motor 11) and on the feedback signals of the positions and velocities detected by the position/velocity detectors 16, 17, carries out the same servo control, such as position loop control, velocity loop control, and further, electrical current loop control, as is carried out conventionally, that is, executes so-called digital servo processing.

The above-described configuration is not different from the conventional electric injection molding machine controller, the difference between the conventional controller and the present invention being that the present invention adds a function that obtains a wear amount of a check valve and predicts the use limit of the check valve.

Figure 4:
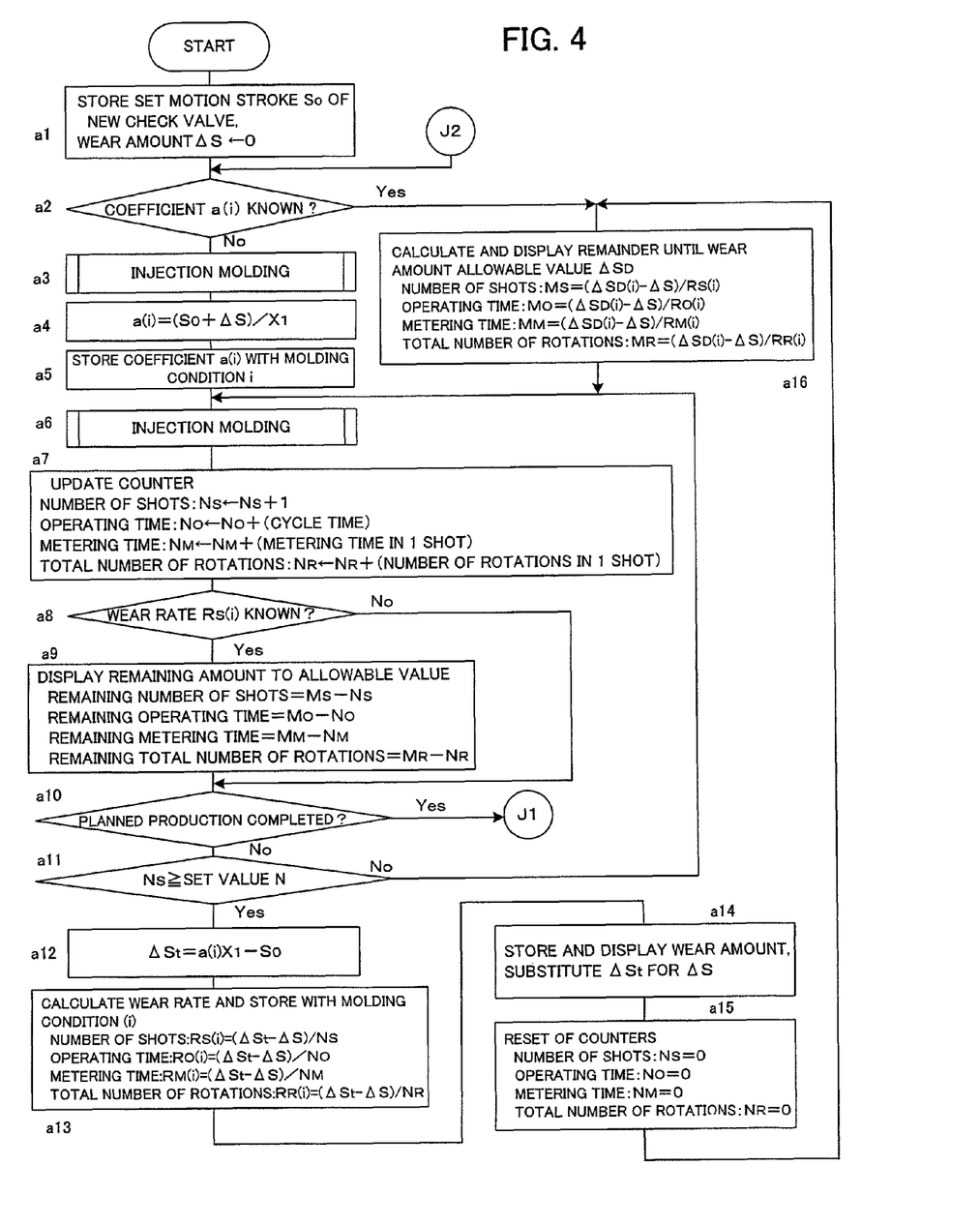
FIG. 4 is a flow chart illustrating an algorithm of a process of calculating check valve wear amount and predicting check valve use limit in a first embodiment of the present invention.
Figure 5:
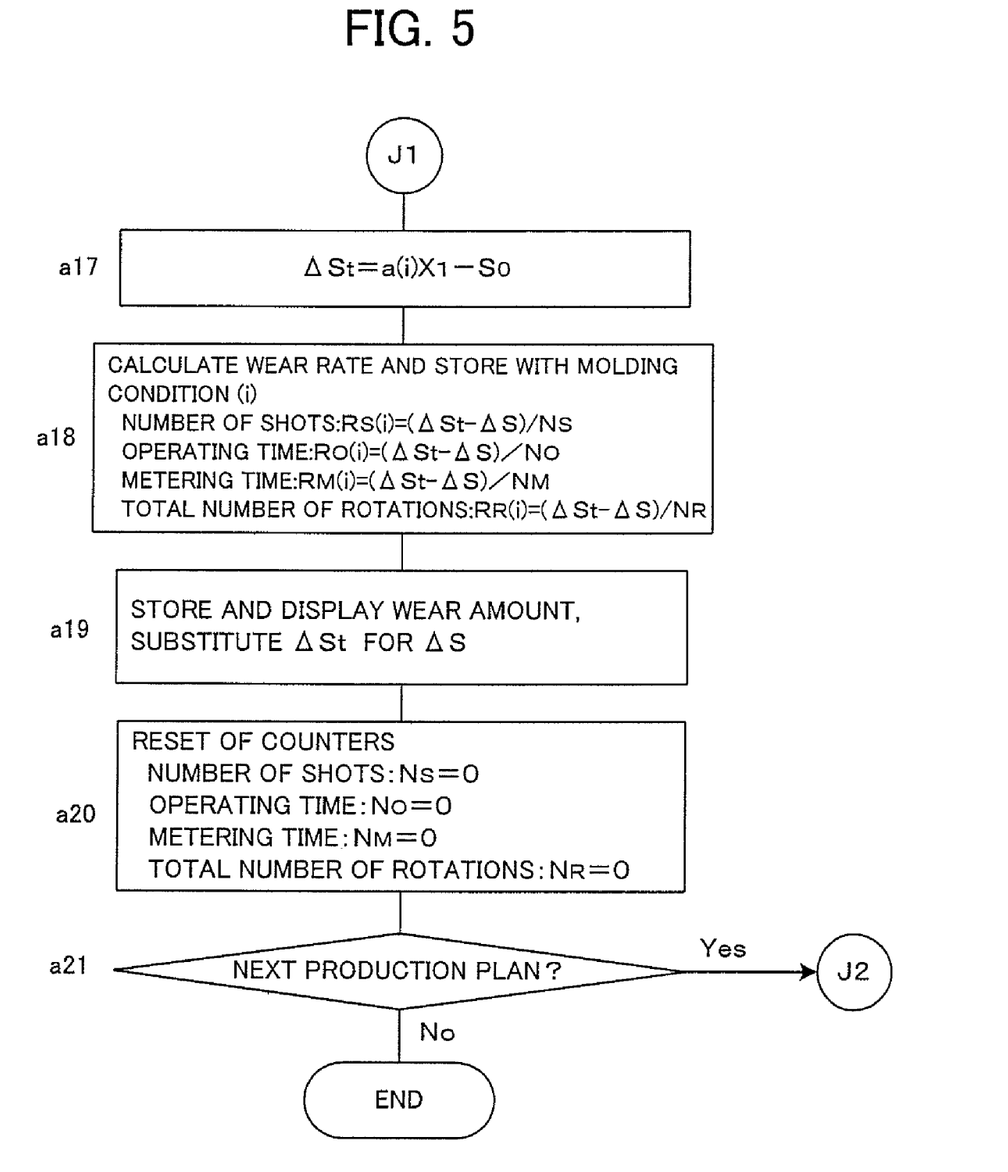
FIG. 5 is a continuation of the flow chart shown in FIG. 4.

FIG. 4 and FIG. 5 are flow charts illustrating an algorithm of a process of calculating check valve wear amount and predicting check valve use limit executed by the CNC CPU 22 in a first embodiment of the present invention. In addition, FIG. 8 and FIG. 9, and FIG. 10 and FIG. 11, are flow charts illustrating an algorithm of a process of calculating check valve wear amount and predicting check valve use limit in a second and a third embodiment of the present invention, respectively. In the first embodiment, a wear amount $\Delta S$, and further, a stroke S, are obtained using formula (2). In the second embodiment, the wear amount $\Delta S$, and further, the stroke S, are obtained using formula (4). In the third embodiment, the wear amount $\Delta S$, and further, the stroke S, are obtained using formula (7).

The only difference between the processing carried out in the first through third embodiments is that, in the first embodiment, Steps a2, a4, a5, a12, and a17 are carried out, whereas in the second embodiment, Steps a2', a4', a5', a12', and a17' are carried out and in the third embodiment, Steps a1", a2", a4", a5", a12", and a17" are carried out. The remaining processes are the same.

Figure 7:
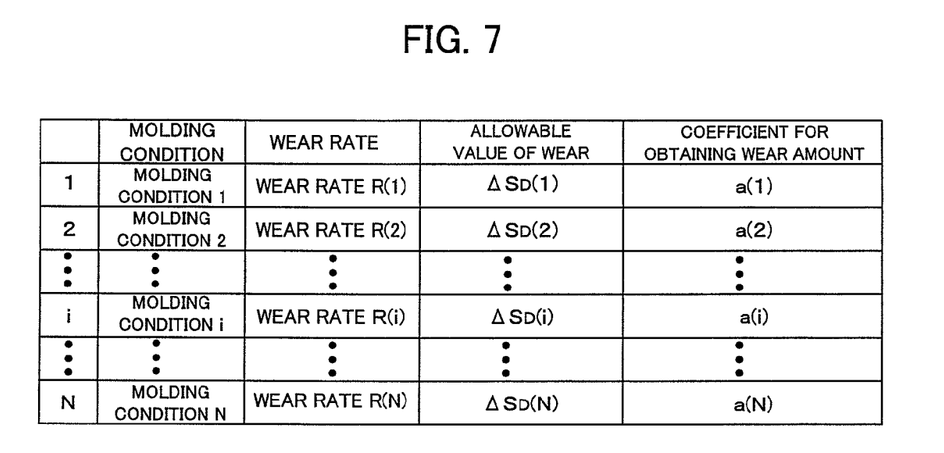
FIG. 7 is a diagram illustrating a storage unit to store check valve wear data to be correlated with molding conditions and stored in the first embodiment of the present invention.
Figure 8:
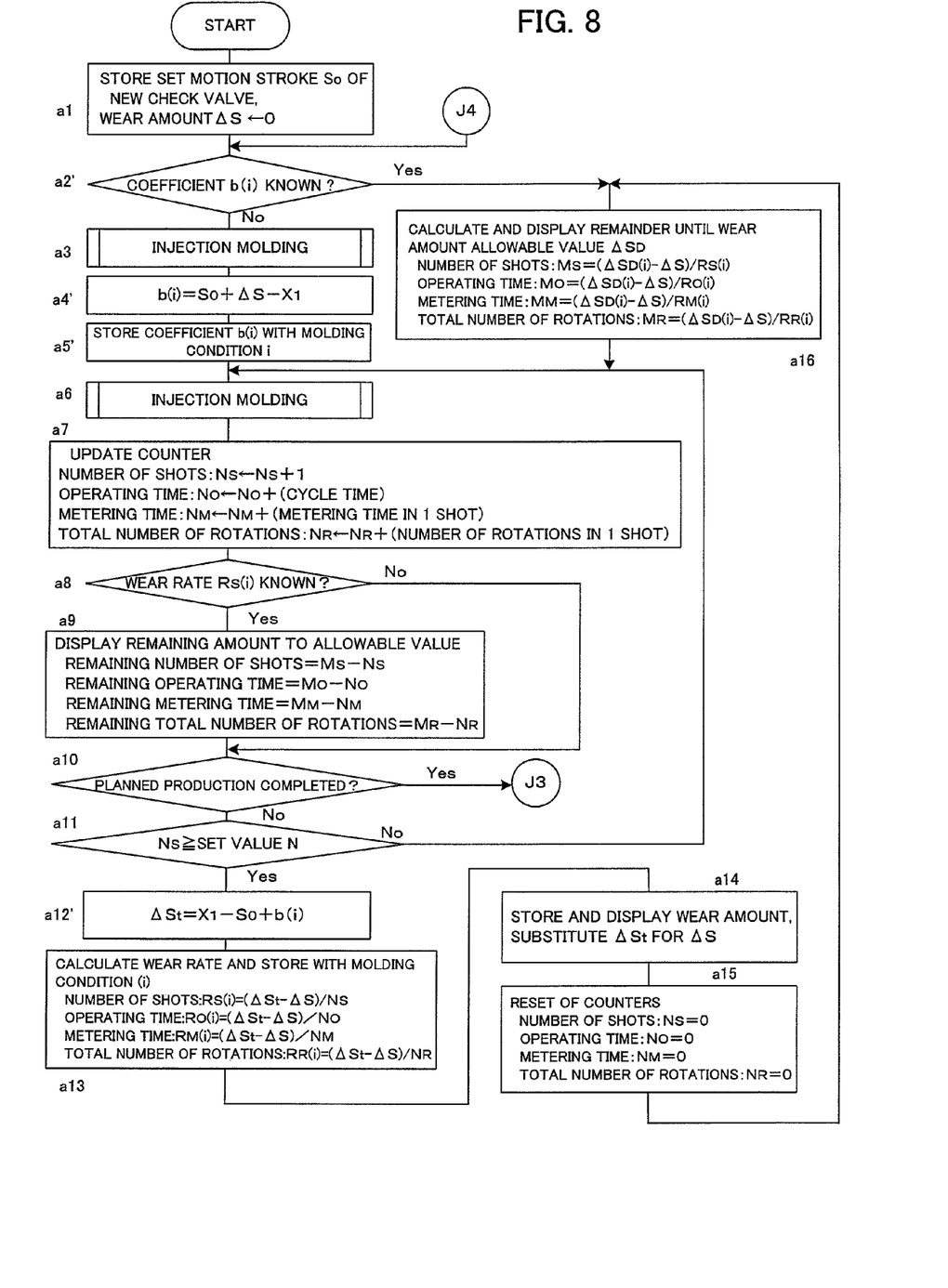
FIG. 8 is a flow chart illustrating an algorithm of a process of calculating check valve wear amount and predicting check valve use limit in a second embodiment of the present invention.
Figure 9:
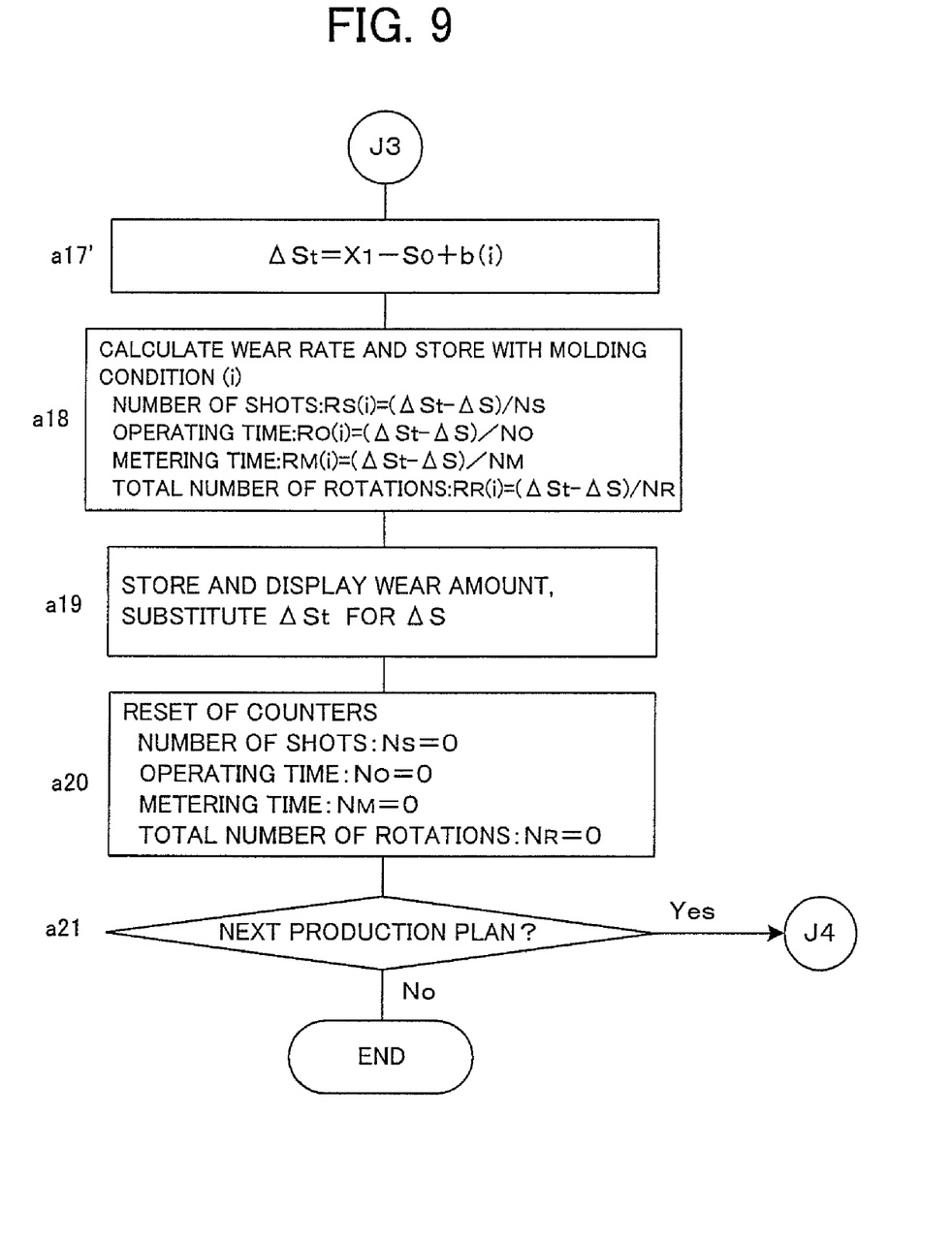
FIG. 9 is a continuation of the flow chart shown in FIG. 8.
Figure 10:
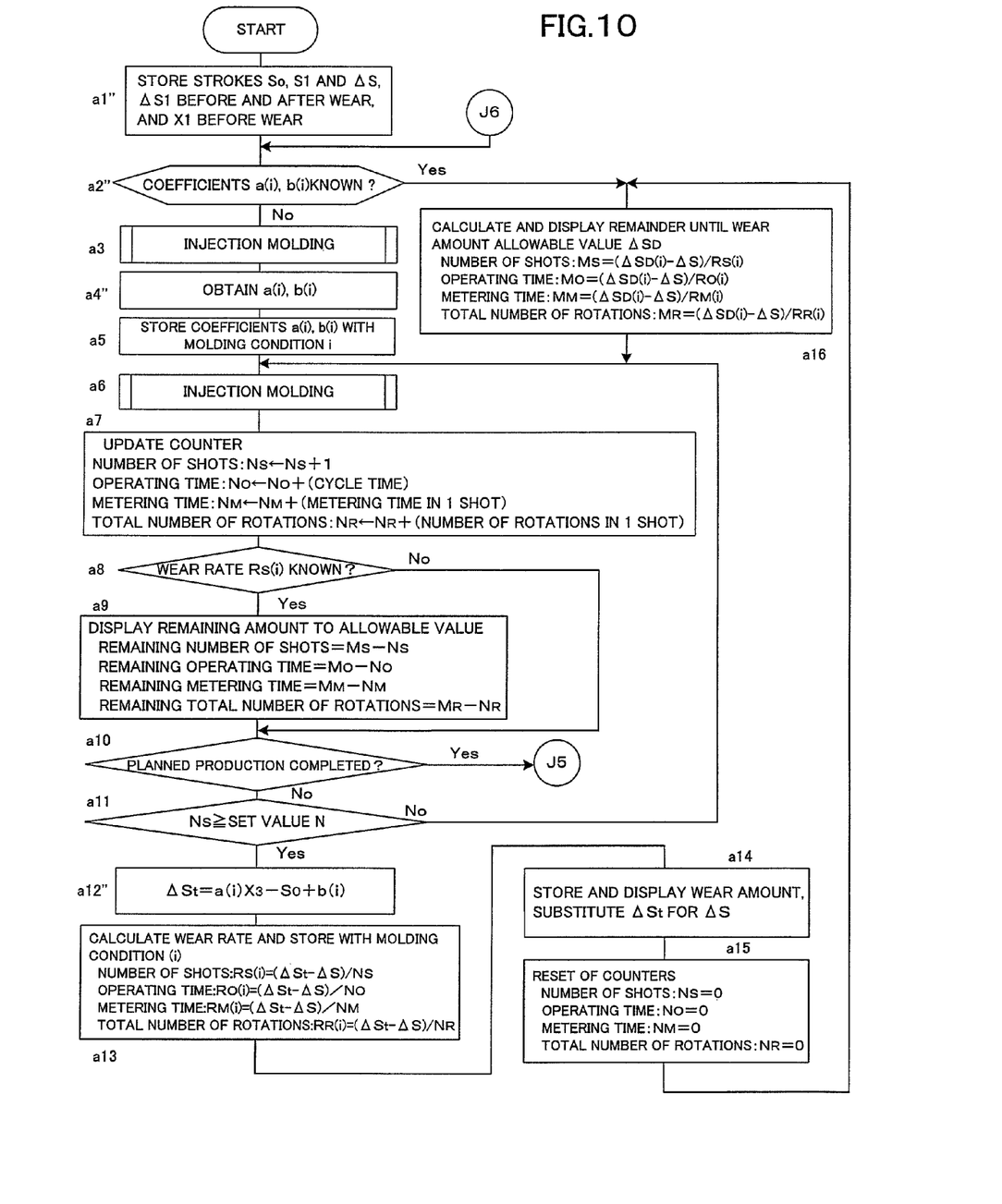
FIG. 10 is a flow chart illustrating an algorithm of a process of calculating check valve wear amount and predicting check valve use limit in a third embodiment of the present invention.
Figure 11:
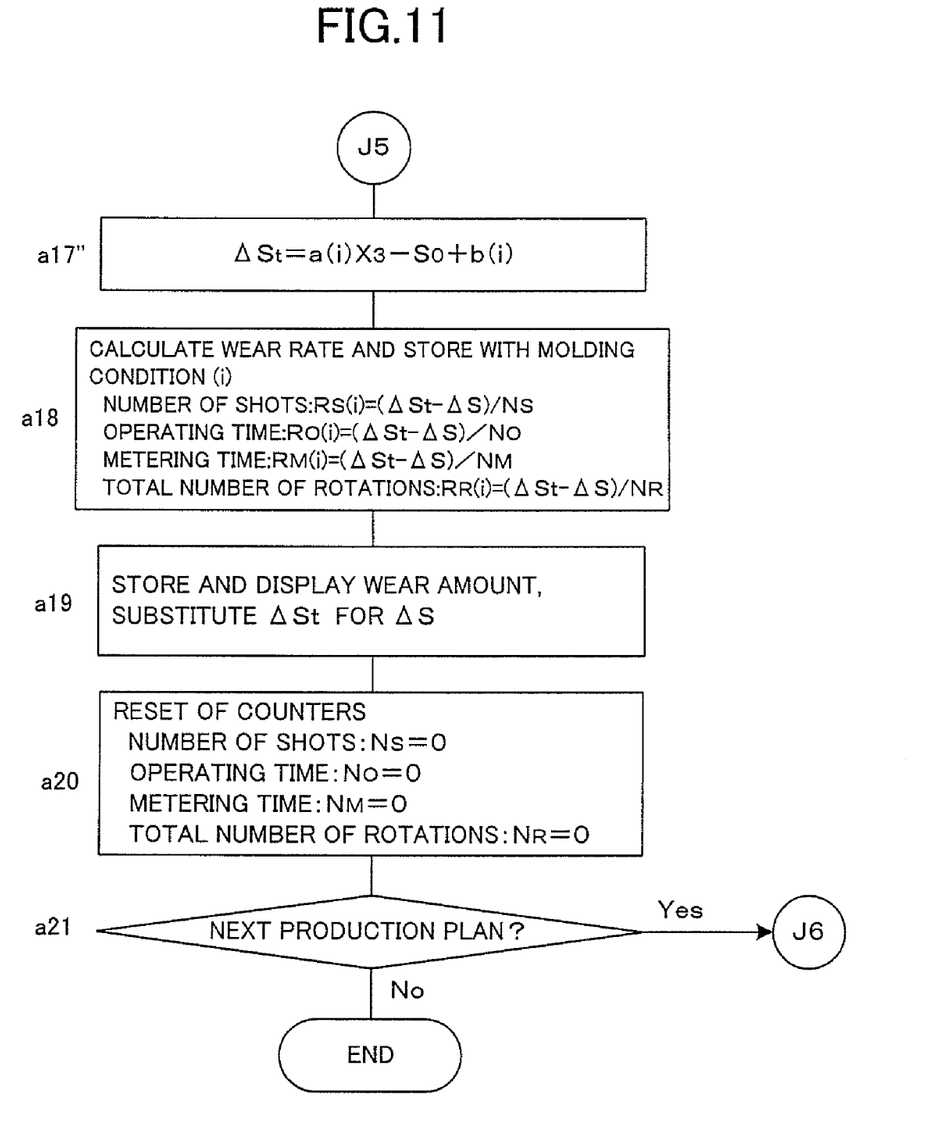
FIG. 11 is continuation the flow chart shown in FIG. 10.

First, as shown in FIG. 7, a table is provided in the molding data storage RAM 23 as a storage unit that stores molding conditions of the injection molding machine for the molded article, with an allowable value of wear $\Delta S_D(i)$ or a travel stroke allowable value $S_D(i)$ (each indicating the use limit of the check valve) set and stored for each molding condition i in the table. In addition, as will be described later, a coefficient a(i) for obtaining a wear rate R(i) and wear amount of the check valve 3 is set and stored for each molding condition in the table.

When the check valve 3 is new, the travel stroke S0 of the check valve 3 is measured and stored, and at the same time the wear amount $\Delta S$ is set to "0". When a previously used check valve 3 is mounted on the screw 1 and used, the stroke of the check valve at the time that it is mounted on the screw is set by setting the stroke S0 when that check valve 3 is unused and the wear amount $\Delta S$ arising from use thereafter. It should be noted that, in the third embodiment, the previously obtained check valve 3 travel stroke S0, wear mount $\Delta S$, screw travel distance X1 from the start of injection to the closing of the check valve with such travel stroke and such wear amount, and current wear amount $\Delta S1$, are set (Step a1).

When evaluating using not the wear amount but the check valve 3 stroke itself, the mounted check valve 3 travel stroke S is set.

Next, it is determined whether or not coefficient a(i) and/or coefficient b(i) are set and stored for the currently selected molding condition i (Step a2), and if neither coefficient is stored, injection molding is carried out to obtain the screw travel distance X1 from the start of injection to the closing of the check valve.

When the screw travel distance from the start of injection to the closing of the check valve is calculated as the stroke of the check valve, a(i)=1 and processing proceeds to Step a6.

Figure 6:
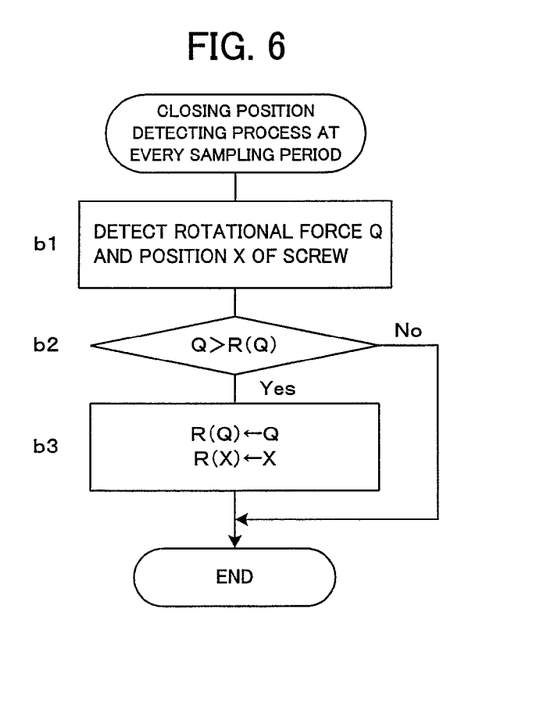
FIG. 6 is a flow chart illustrating an algorithm of a process of detecting a closing of the check valve executed at every predetermined sampling period during injection and pressure holding stages in the embodiments.

The process of obtaining the screw travel distance X1 from the start of injection to the closing of the check valve is shown in FIG. 6. FIG. 6 shows the check valve closing position detection process that the CNC CPU 22 executes every predetermined sampling period during the injection and pressure holding stages. In the injection and pressure holding stages during a molding operation, first, after the screw position XS at the start of injection is read in and stored, injection is started, and together with the start of injection the process illustrated in FIG. 6 is executed. First, the screw rotational force Q obtained by the disturbance observer incorporated in the servo CPU 25 processing and the screw position X stored in the current position storage register are obtained (step b1), and it is determined whether or not the screw rotational force Q that is obtained is greater than the screw rotational force stored in the register R(Q) (step b2). It should be noted that the register R(Q) is initially set at "0" at the start of injection. Initially, the obtained screw rotational force Q is greater than the screw rotational force stored in the register R(Q), and therefore, this screw rotational force Q is stored in the register R(Q) while the detected screw position is stored in the register R(X) (step b3). Thereafter, the processes of steps b1 through b3 are executed at every sampling period.

At the start of injection the injection pressure increases, and therefore the screw rotational force Q increases until the check valve 3 closes. As a result, until the check valve 3 closes, processing shifts from step b2 to step b3 and the registers R(Q), R(X) are successively rewritten. Once the check valve 3 closes, the screw rotational force Q drops, and in step b2 the obtained screw rotational force Q become smaller than the rotational force stored in register R(Q). Accordingly, the registers R(Q), R(X) are not updated and the sampling period process ends as is. As a result, in register R(X), the point in time at which the screw rotational force Q peaks, that is, the position X of the screw at the moment in time when the check valve 3 closes, is saved and stored.

When molding ends, the screw travel distance X1 from the start of injection to the closing of the check valve 3 is obtained from the difference between the screw position X when the check valve 3 closes obtained as described above and the screw position XS at the start of injection (X1=XS−X), and coefficient a and/or coefficient b are obtained by carrying out the calculations of the following formula (8) and formula (9) corresponding to formula (1) (Step a3):

$$a(i)=(S0+\Delta S)/X1 \quad (8)$$

$$b(i)=(S0+\Delta S)-X1 \quad (9)$$

When using formula (7):

$$a(i)=(\Delta S-\Delta S1)/(X2-X1) \quad (10)$$

$$b(i)=S0-(\Delta S1X2+\Delta SX1)/(X2-X1) \quad (11)$$

When evaluating using not the wear amount but the check valve 3 stroke itself, coefficient a and/or coefficient b are obtained by carrying out the calculations of the following formulas:

$$a(i)=S/X1 \quad (12)$$

$$b(i)=S-X1 \quad (13)$$

When using formula (7):

$$a(i)=(S-S1)/(X2-X1) \quad (14)$$

$$b(i)=(S1X2-SX1)/(X2-X1) \quad (15)$$

The coefficients thus obtained, as shown in FIG. 7, are correlated with molding condition i and stored (Step a5). Then, the procedure proceeds to Step a6 and the next molding is begun.

By contrast, if in Step a2 it is determined that coefficient a(i) and/or coefficient b(i) are set and stored, then the procedure proceeds to Step a16 and a wear amount allowable amount $\Delta S_D(i)$ or a remainder until the travel stroke allowable value $S_D(i)$ is reached (in terms of number of molding shots, operating time, metering time, and total number of rotations) is calculated and displayed on the display screen of the display/data input device 30, after which the procedure proceeds to Step a6. That the coefficient a and/or the coefficient b are already set in the table that stores molding conditions as shown in FIG. 7 means that the wear allowable amount $\Delta S_D$ or the travel stroke allowable value $S_D(i)$ and the wear rate R(i) are already set and stored therein, and therefore, from this data and from the wear amount $\Delta S$ or the travel stroke S set in Step a1, the remaining usable amount is obtained and displayed. In the present embodiment, the remaining amount is obtained and displayed as the number of molding shots $M_S$, the operating time $M_O$, the metering time $M_M$, and the total number of rotations $M_R$, any one of which is sufficient.

The number of remaining shots $M_S$ is obtained by subtracting the wear amount $\Delta S$ from the wear allowable amount $\Delta S_D(i)$ (the allowable amount indicating the use limit of the check valve) and dividing the remainder by the wear rate in units of shots $R_S(i)$. The other indicia of usable amounts, operating time $M_O$, metering time $M_M$, and total number of the screw 1 rotations $M_R$, are similarly obtained by subtracting the wear amount $\Delta S$ from the wear allowable amount $\Delta S_D(i)$ and dividing the difference by the wear rate in units of operating time $R_O(i)$, the wear rate in units of metering time $R_M(i)$, and the wear rate in units of the number of rotations $R_R(i)$, respectively. The results are then displayed, any one of which is sufficient.

When evaluating using not the wear amount but the check valve 3 stroke itself, instead of subtracting the wear amount $\Delta S$ from the allowable value of wear $\Delta S_D(i)$, the travel stroke S subtracted from the travel stroke allowable value $S_D(i)$:

$$M_S=(\Delta S_D(i)-\Delta S)/R_S(i)$$

$$M_O=(\Delta S_D(i)-\Delta S)/R_O(i)$$

$$M_M=(\Delta S_D(i)-\Delta S)/R_M(i)$$

$$M_R=(\Delta S_D(i)-\Delta S)/R_R(i)$$

Or:

$$M_S=(S_D(i)-S)/R_S(i)$$

$$M_O=(S_D(i)-S)/R_O(i)$$

$$M_M=(S_D(i)-S)/R_M(i)$$

$$M_R=(S_D(i)-S)/R_R(i)$$

In Step a6, the molding operation is executed and counters are updated (Step a7). To the shot number Ns counter "1" is added, to the operating time No counter a cycle time needed for the molding operation measured during the molding operation carried out in Step a6 is added, to the metering time $N_M$ counter is added the metering time measured during the molding operation, and to the number of rotations $N_R$ counter is added the number of rotations of the screw 1 measured during the molding operation (Step a7).

It should be noted that the operating time $N_O$ is obtained by measuring with a timer or the like a molding cycle time period extending from the start of the molding operation in Step a6 to the end of that molding operation. Similarly, the metering time $N_M$ is obtained by measuring with a timer or the like a time period from the start of metering to the end of metering during the molding operation. Further, the total number of rotations $N_R$ is obtained by either adding up the position feedback signals from the position/velocity detector 16 mounted on the screw rotation servo motor 10 or by adding up single rotation signals from the position/velocity detector 16 (one pulse output signal for each rotation).

Next, it is determined whether or not the wear rate is set and stored in the table and thus known. If the wear rate is not known, then processing proceeds to Step a10. If the wear rate is known, then the values for the number of shots $N_S$, the operating time $N_O$, the metering time $N_M$, and the total number of rotations $N_R$ obtained in Step a7 are then subtracted respectively from the number of shots $M_S$, the operating time $M_O$, the metering time $M_M$ and the total number of screw rotations $M_R$ indicating the remaining usable amount obtained in Step a16 and the and the remaining amount to the allowable value is obtained and displayed, after which the procedure proceeds to Step a10.

Remaining number of shots=$M_S$-$N_S$
Remaining operating time $M_O$-$N_O$
Remaining metering time=$M_M$-$N_M$
Remaining total number of rotations=$M_R$-$N_R$ In Step a10, it is determined whether or not a set planned production number of molded products has been reached. If so, then processing proceeds to Step a17. If not, then processing proceeds to Step a11 and it is determined whether or not the number of shots $N_S$ has reached or exceeded a preset number of shots N for wear amount revision. If not, then the procedure proceeds to Step a6 and the molding operation is executed. The processes of from Step a6 through Step a11 are repeated until the number of shots $N_S$ reaches the set number N.

Once the number of shots Ns reaches the set number N, the calculation of formula corresponding to formula (2) described above is carried out to obtain the wear amount $\Delta St$ (Step a12), or the travel stroke St is obtained.

$$\Delta St=a(i)X1-S0$$

$$\Delta St=b(i)+X1-S0$$

$$St=a(i)X1$$

$$St=b(i)+X1$$

The wear amount that was obtained when the wear amount was previously updated is subtracted from the wear amount thus obtained to obtain the wear amount during such wear amount revision interval (an interval in which the molding operation is executed N times), which is divided by the number of shots, the time, the number of rotations and the like during such interval to obtain the wear rates $R_S(i)$, $R_O(i)$, $R_M(i)$, and $R_R(i)$ corresponding to the number of shots, the operating time, the metering time, and the number of rotations (Step a13).

When evaluating using not the wear amount but the check valve 3 stroke itself, instead of subtracting the wear amount obtained when the wear amount was previously updated from the wear amount, the travel stroke that was obtained when the wear amount was previously updated is subtracted from the obtained travel stroke:

$$R_S(i)=(\Delta St-\Delta S)/N_S$$

$$R_O(i)=(\Delta St-\Delta S)/N_O$$

$$R_M(i)=(\Delta St-\Delta S)/N_M$$

$$R_R(i)=(\Delta St-\Delta S)/N_R$$

Or:

$$R_S(i)=(St-S)/N_S$$

$$R_O(i)=(St-S)/N_O$$

$$R_M(i)=(St-S)/N_M$$

$$R_R(i)=(St-S)/N_R$$

Next, the wear amount $\Delta St$ or the travel stroke St obtained in Step a12 are stored as wear amount $\Delta S$ or travel stroke S up to when such calculation was performed. The stored wear amount $\Delta S$ or travel stroke S is then displayed on the display screen of the display/data input device 30. In this case, the display involves displaying a ratio ($\Delta S/\Delta S_D(i)$) of wear amount to the wear amount allowable value $\Delta S_D(i)$, a degree of wear, or the like. In addition, when using the travel stroke for evaluation, the display involves displaying a ratio ($S/S_D(i)$) of travel stroke to travel stroke allowable value $S_D(i)$, displaying the degree of wear, and so forth (Step a14). Next the number of shots $N_S$, the operating time $N_O$, the metering time $N_M$, and the total number of rotations $N_R$ to be stored in the counter are set at "0" (Step a15), and the procedure returns to Step a16, after which the processes from Step a16 and thereafter as described above are executed.

Then, when the number of molded articles reaches the planned production number, processing shifts from Step a10 to Step a17 and the same processes as those of Steps a12 through a15 described above are carried out (Steps a17 through a20). Specifically, the check valve 3 current wear amount ΔSt is obtained (Step a17), the wear rate is updated (Step a18), the wear amount ΔSt is stored and displayed (Step a19), and the counters are reset (Step a20). Thereafter, it is determined whether or not a next production plan has been inputted (Step a21), and if so, the procedure returns to Step a2 and, based on the molding conditions of the commands that have been inputted, it is determined whether or not coefficients a and/or b are known and the processes described above are executed. If no next production plan has been inputted, processing ends.

Figure 12:
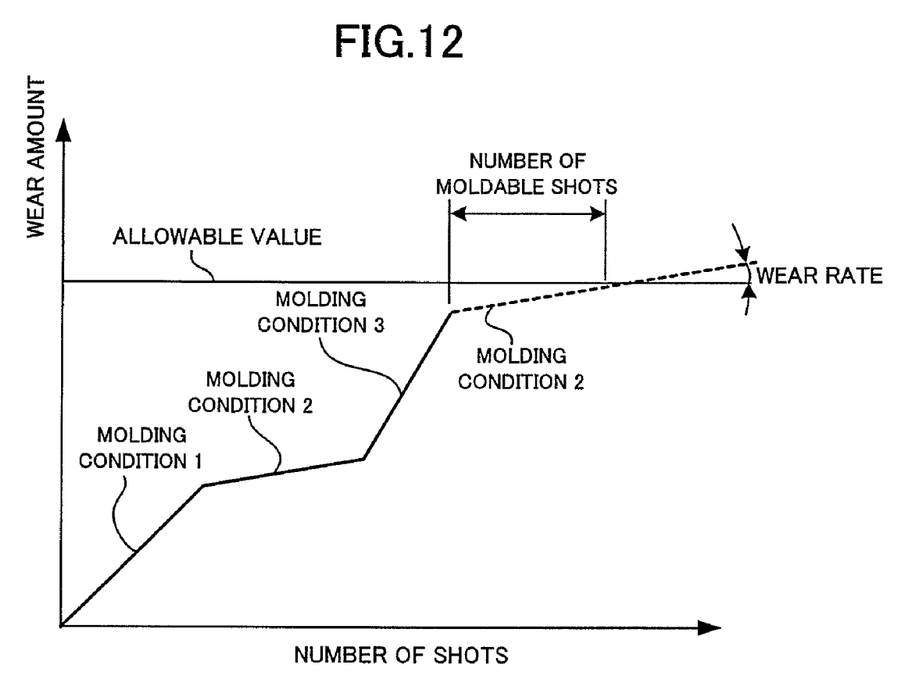
FIG. 12 is a diagram illustrating production plan and check valve wear amount prediction.

As described above, the present embodiment stores together with the molding conditions, the wear rate R(i), the allowable value of wear $\Delta S_D(i)$, and the coefficient a(i) and/or the coefficient b(i) used to calculate the wear amount of the check valve 3 from the screw travel distance from the start of injection to the closing of the check valve 3 corresponding to the molding conditions. Therefore, even when carrying out production with multiple resins/molds, as shown in FIG. 12 the wear amount when the production plan ends can be predicted, as can the timing at which the wear amount is predicted to exceed the allowable value.

In addition, by enabling replacement parts to be prepared in advance as the time at which the wear amount of the check valve 3 will exceed the allowable value approaches, the present invention enables the occurrence of defective moldings to be reduced as well as efficient production to be carried out.

Further, planning production so as to proceed first from molding conditions with small allowable values of wear in order to extend the useful life of the check valves also contributes to sound production planning. For the allowable value of wear $\Delta S_D(i)$ or the travel stroke allowable value $S_D(i)$ appropriate initial values may be input at first, and those values updated after carrying out molding and determining the actual allowable values. It should be noted that, when using different resins under the same molding conditions, it is preferable to store such molding conditions as separate molding conditions.

In addition, the wear amount, the remaining number of shots until the allowable value for the wear amount is reached, the degree of wear corresponding to the allowable value, and the like, may be displayed as a number or plotted, shown as a bar graph or a pie chart, or the like at each shot for a past, predetermined number of shots. Alternatively, the travel stroke may be used instead of the wear amount.

It should be noted that although the embodiments described above use detecting the closing of the check valve during the injection and pressure holding stages, when using a molding technique that adds a step of advancing the screw prior to the start of injection after completion of metering in order to close the check valve (as, for example, in JP52-151352A and JP53-39358A), the present invention may be applied by detecting the point in time at which the screw rotational force peaks as the point in time at which the check valve closes in the step of advancing the screw that is carried out prior to the start of injection but after the completion of metering.

In addition, although the foregoing embodiments are described in terms of instances in which the check valve stroke increases due to wear on an end face of the check valve, the present invention is also applicable to instances in which a face of the screw head or of the check seat that contacts the check valve wears down while the end face of the check valve does not.

In addition, although the foregoing embodiments are configured to use a disturbance observer to detect screw rotational force, alternatively the rotational force may be detected from the drive current of the motor that rotationally drives the screw, or, if a hydraulic motor is used as the screw rotary drive means, the rotational force may be detected from the hydraulic pressure. Further, a warp sensor may be mounted on the screw to detect the rotational force.

What is claimed is:

1. An injection molding machine, comprising:
   a screw having a check valve and arranged rotatable and axially movable in a cylinder;
   detecting means for detecting an axial position of said screw in an advancing motion of said screw in the cylinder;
   check-valve closing position determining means that determines an axial position of said screw when said check valve closes in the advancing motion of said screw, as a check-valve closing position; and
   calculating means that calculates a distance of the axial motion of said screw from a position where said screw starts the advancing motion to the check-valve closing position as a check valve closing stroke.

2. An injection molding machine, comprising:
   a screw having a check valve and arranged rotatable and axially movable in a cylinder;
   detecting means for detecting an axial position of said screw in an advancing motion of said screw in the cylinder;
   check-valve closing position determining means that determines an axial position of said screw when said check valve closes in the advancing motion of said screw, as a check-valve closing position; and
   display means that displays a distance of the axial motion of said screw from a position where said screw starts the advancing motion to the check-valve closing position.

3. An injection molding machine, comprising:
   a screw having a check valve and arranged rotatable and axially movable in a cylinder;
   detecting means for detecting an axial position of said screw in an advancing motion of said screw in the cylinder;
   check-valve closing position determining means that determines an axial position of said screw when said check valve closes in the advancing motion of said screw, as a check-valve closing position; and
   display means that displays the check-valve closing position.

4. An injection molding machine, comprising:
   a screw having a check valve and arranged rotatable and axially movable in a cylinder;
   detecting means for detecting an axial position of said screw in an advancing motion of said screw in the cylinder;
   check-valve closing position determining means that determines an axial position of said screw when said check valve closes in the advancing motion of said screw, as a check-valve closing position; and
   closing-stroke calculating means that calculates a check-valve closing stroke based on a set closing stroke of the check valve when the check valve is newly mounted on said screw and a distance of the axial motion of said screw from a position where said screw starts the advancing motion to the determined check-valve closing position with the check valve newly mounted on said screw, and a distance of the axial motion of said screw from a position where said screw starts the advancing motion to the determined check-valve closing position with the check valve after being used in injection molding operations.

5. An injection molding machine according to claim 1, further comprising wear-amount calculating means that calculates a wear amount of at least one of said check valve, a screw head and a check seat based on an initial closing stroke and a set wear amount when said check valve is newly mounted on said screw and the check-valve closing stroke calculated by said calculating means.

6. An injection molding machine according to claim 1, wherein said check-valve closing position determining means comprises a rotational force detecting means that detects a rotational force exerted on said screw, and determines the axial position of said screw where the rotational force exerted on said screw detected in the advance motion of said screw peaks as the check valve closing position.

7. An injection molding machine according to claim 5, wherein said check-valve closing position determining means comprises a rotational force detecting means that detects a rotational force exerted on said screw, and determines the axial position of said screw where the rotational force exerted on said screw detected in the advance motion of said screw peaks as the check valve closing position.

8. An injection molding machine according to claim 1, further comprising wear rate calculating means that calculates a wear rate based on an amount of change in the calculated wear amount or an mount of change in the calculated closing stroke, and predicting means that predicts when the wear amount will exceed an allowable value using the calculated wear rate.

9. An injection molding machine according to claim 5, further comprising wear rate calculating means that calculates a wear rate based on an amount of change in the calculated wear amount or an mount of change in the calculated closing stroke, and predicting means that predicts when the wear amount will exceed an allowable value using the calculated wear rate.

10. An injection molding machine according to claim 8, wherein said wear rate calculating means calculates the wear rate by dividing the amount of change in the calculated wear amount or the mount of change in the calculated closing stroke by any one of the number of mold shots, operating time of the injection molding machine, metering time and the number of screw rotations in a period during which the amount of change in the calculated wear amount or the amount of change in the calculated closing stroke occurred.

11. An injection molding machine according to claim 9, wherein said wear rate calculating means calculates the wear rate by dividing the amount of change in the calculated wear amount or the mount of change in the calculated closing stroke by any one of the number of mold shots, operating time of the injection molding machine, metering time and the number of screw rotations in a period during which the amount of change in the calculated wear amount or the amount of change in the calculated closing stroke occurred.

* * * * *